United States Patent [19]

Krosp et al.

[11] Patent Number: 4,949,701
[45] Date of Patent: Aug. 21, 1990

[54] TABLE OR CART ASSEMBLY

[75] Inventors: Charles W. Krosp, Paragould, Ark.;
James E. Lockridge, Burlington, Vt.;
Harvey L. Crow, Jr., Paragould, Ark.

[73] Assignee: Arkla, Inc., Little Rock, Ark.

[21] Appl. No.: 375,046

[22] Filed: Jul. 3, 1989

[51] Int. Cl.⁵ ............................................. F24C 3/00
[52] U.S. Cl. ..................................... 126/41 R; 126/50;
126/304 A; 126/9 R; 280/401
[58] Field of Search ...................... 126/41 R, 50, 39 B,
126/37 B, 9 R, 304 R, 304 A, 305; 108/33, 35,
36, 44, 115, 121; 280/401, DIG. 4

[56] References Cited

U.S. PATENT DOCUMENTS

| | | | |
|---|---|---|---|
| 2,559,710 | 7/1951 | Danielsen | 126/304 A |
| 2,780,474 | 2/1957 | Farah et al. | 126/304 A |
| 2,838,991 | 6/1958 | Kleinmann et al. | 126/9 K |
| 2,994,315 | 8/1961 | Bussing | 126/9 |
| 3,297,016 | 1/1967 | Rhodes | 126/9 X |
| 3,386,430 | 6/1968 | Linstead | |
| 3,863,946 | 2/1975 | Dotson | |
| 4,337,751 | 7/1982 | Sampson et al. | |
| 4,505,495 | 3/1985 | Foss et al. | |
| 4,665,891 | 5/1987 | Nemec et al. | |
| 4,718,399 | 1/1988 | Shepherd | 126/9 B |

OTHER PUBLICATIONS

Preway, Inc.–ARKLAMATIC Outdoor Gas Grill Assembly Instructions and Parts List, Stock No. 42681, 12/1987.

Primary Examiner—Larry Jones
Attorney, Agent, or Firm—Allan O. Maki; Arnold J. Ericsen; C. Thomas Sylke

[57] ABSTRACT

A cart/table unit includes a top, a base and opposed upright members in pre-assembled pivotal relationship, collapsed for shipping purposes. The unit may be assembled by unfolding to find operating position without requiring tools, and retained in operated position by means of automatically operated latching and stabilizing mechanisms. The unit has particular application for use in connection with gas-fired barbecue grills.

12 Claims, 3 Drawing Sheets

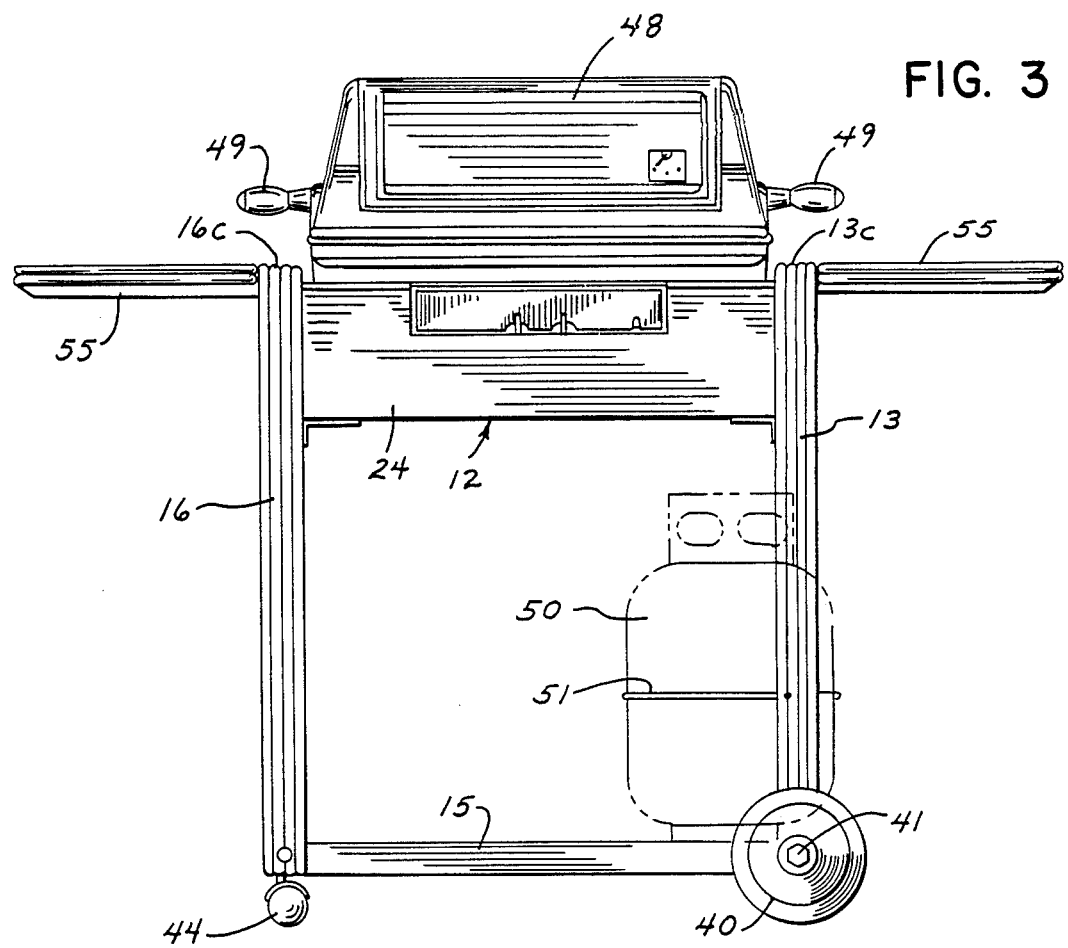
FIG. 3
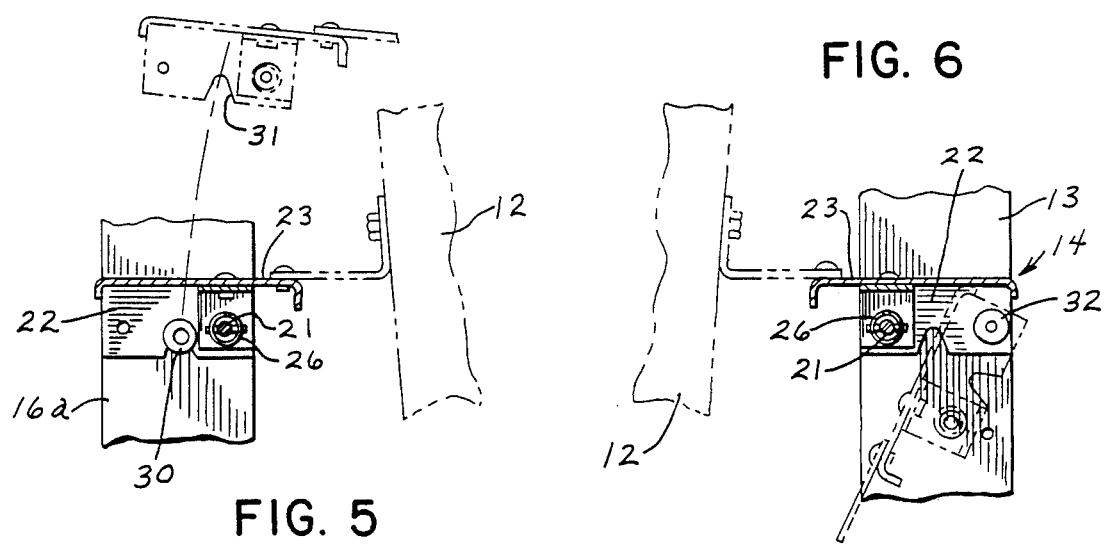
FIG. 6
FIG. 5

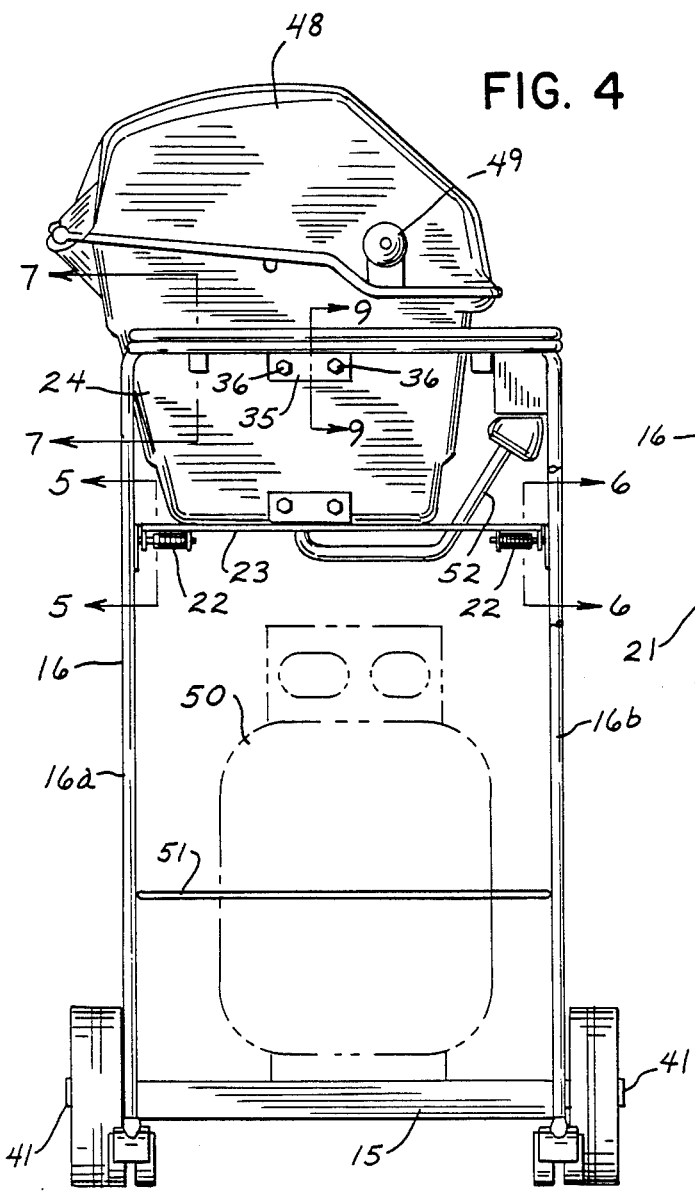
FIG. 4
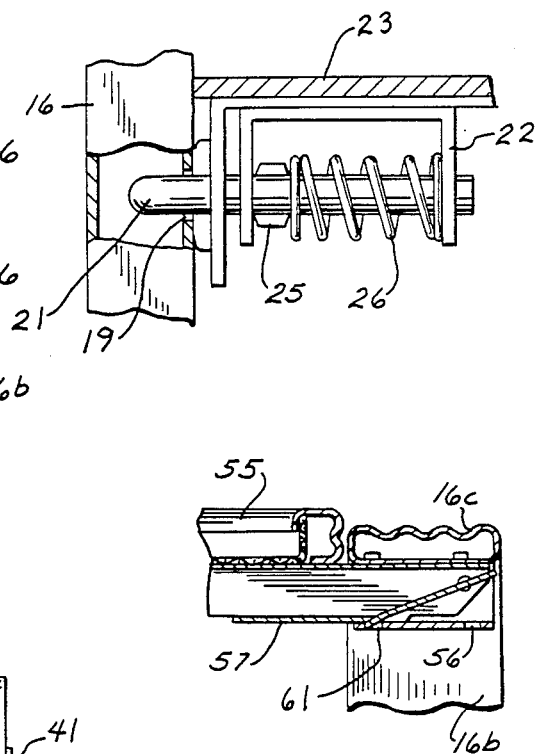
FIG. 10
FIG. 7
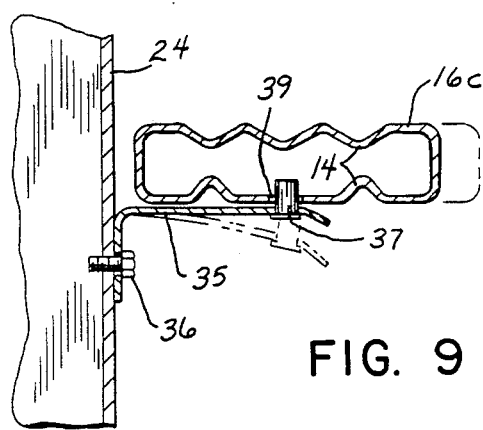
FIG. 9
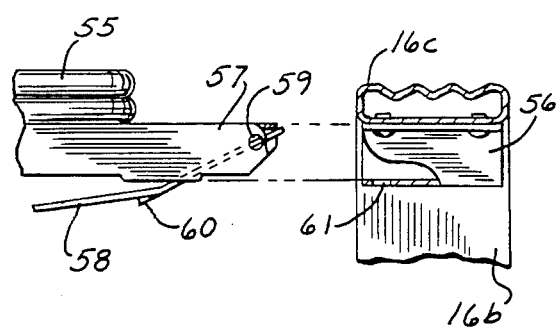
FIG. 8

TABLE OR CART ASSEMBLY

BACKGROUND OF THE INVENTION

1. Field of Invention

A partially pre-assembled table or cart construction having particular application in supporting gas cooking grills.

2. Description of the Prior Art

A brochure entitled "Assembly Instructions & Parts List" for outdoor gas grills, further identified as Stock No. 42681, dated December, 1987, and published by the assignee of this present application, is representative of typical prior art. Even a cursory observation of the brochure will indicate the relatively complex and frustrating process of subassembling and assembling the various component parts of a cart and grill unit. There is a multiplicity of components required for completion of the assembly by an ultimate consumer. The procedure is frustrating and time consuming, to say the very least. The particular prior art unit of the brochure merely exemplifies a universal problem which is of equal concern in the various competitive devices presently being marketed.

Prior art devices, often require at least six assembly "steps", and each step requires additional subassembly steps. It will be further noted from the aforementioned publication, that assembly requires several tools including a blade screwdriver, a phillips screwdriver, an adjustable wrench and a pair of pliers.

SUMMARY OF THE INVENTION

It is a principal object of the present invention to provide a supporting table or cart having particular adaptation in supporting an outdoor barbecue gas grill. The novel table or cart is factory pre-assembled and packaged for ready and facile final assembly by the ultimate consumer without need of tools other than a brush and soap solution for checking for gas leaks.

A corollary object of the present invention is to minimize the number and variety of components and fasteners required for construction and assembly of a cart or table for support of objects, such as barbecue grills.

Another object of the present invention is to provide a table or cart having its various components factory pre-assembled and folded relative to one another to a minimum height for packaging and which parts are readily unfolded to operating position and secured relative to one another by the ultimate purchaser without need for insertion of fasteners or for assembly tools.

It is a further object of the present invention to provide a table or cart assembly having one or more laterally extendable shelves, and which shelves may be readily inserted into and supported by the table or cart and which are readily removable therefrom for use as serving trays or for facilitating cleaning after use.

The improved cart or table has particular application for use in supporting the body of typical barbecue gas grill and preferably contains a rectangular base including oppositely disposed U-shaped leg members which are pivotally attached at their respective distal ends to the base and wherein at least one of the U-shaped leg members may be attached to the grill body by means of a spring biased fastener after the body and the leg members have been pivotally rotated to an upright position relative to the base member, and without the benefit of separate fasteners or assembly tools.

BRIEF DESCRIPTION OF THE DRAWINGS

FIG. 3 is a front elevational view of the finally assembly cart or table including the gas grill subassembly supported thereby;

FIG. 4 is an end elevational view taken from the left of FIG. 3;

FIG. 5 is a fragmentary view, partially in section, taken along lines 5—5 of FIG. 4 and illustrating the latching mechanism used for joining the castor upright member with a support member attached to the bottom of the grill subassembly, and with the latch shown in bold lines in the secured position;

FIG. 6 is a fragmentary view taken along lines 6—6 of FIG. 4, but of the wheel upright member illustrating the mechanism substantially identical to FIG. 5, but using this multipurpose mechanism as the pivot member originally supporting the grill subassembly on the wheel upright member. The pivoting function is shown in phantom lines and the bold lines illustrate the final latching position of the cooperating members;

FIG. 7 is a fragmentary sectional view taken along lines 7—7 of FIG. 4 and illustrating the shelf latching mechanism for detachably retaining a removable side shelf relative to the cart or table assembly, and with the members being shown in secured latching position;

FIG. 8 is a fragmentary sectional view similar to the view of FIG. 7 and illustrating the shelf and its latching mechanism in position just prior to insertion in its stationary retaining member;

FIG. 9 is a fragmentary sectional view taken along lines 9—9 of FIG. 4 and illustrating the stabilizing mechanism for minimizing lateral movement of the cart components relative to the grill assembly and further illustrating in cross-section the preferred configuration of the tubular upright members; and FIG. 10 is a fragmentary, enlarged sectional view of the latching mechanism of FIG. 6.

DESCRIPTION OF THE PREFERRED EMBODIMENT

Figure 1:
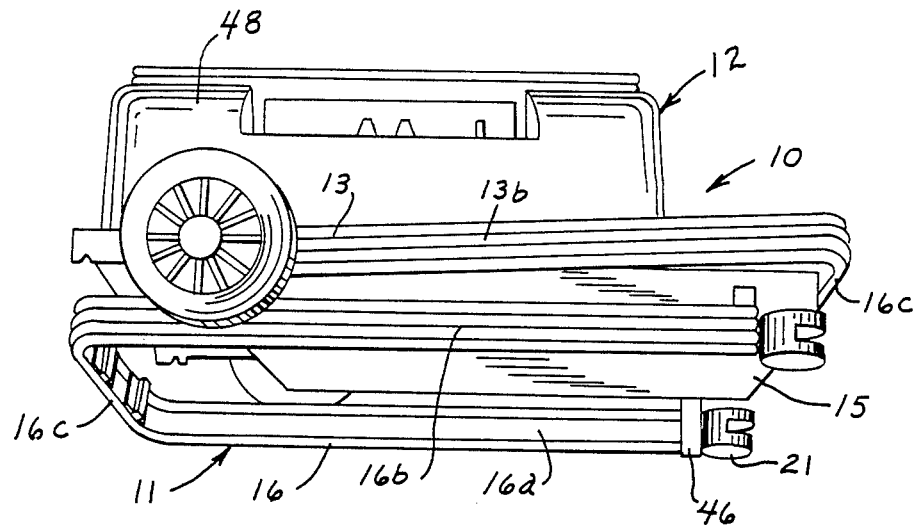
FIG. 1 is a perspective view of a cart or table assembly used in connection with a gas grill subassembly, shown in collapsed or folded condition as it has just been removed from its shipping carton.
Figure 2:
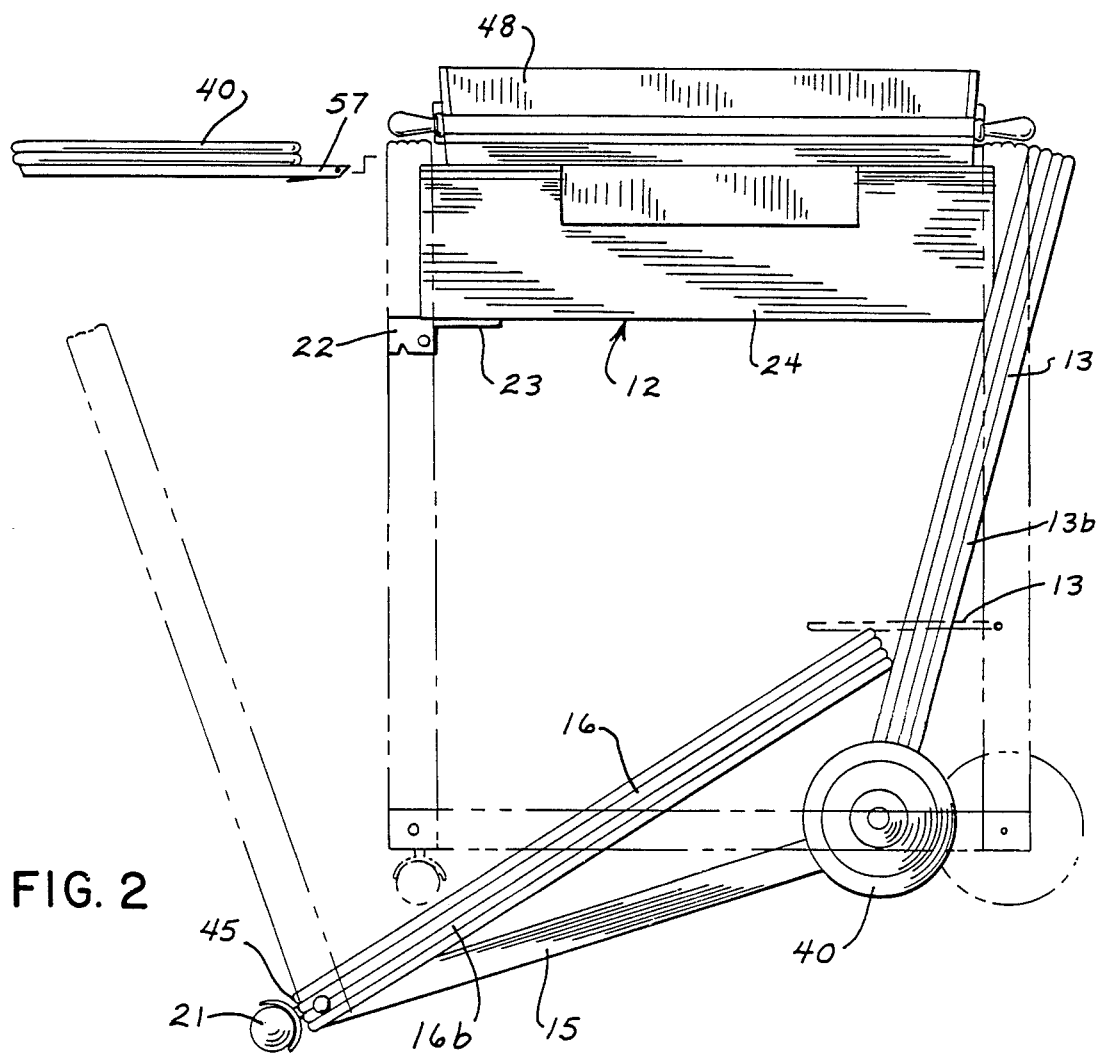
FIG. 2 is a front elevational view of the cart or table of FIG. 1, wherein both bold and phantom lines illustrate various positions of cooperating elements during unfolding the unit from the condition shown in FIG. 1 to the finally assembled operating position.

With reference to the drawings, and, with particular reference to the views of FIGS. 1, 2 and 3, the cart or table assembly of the present invention finds particular use in conjunction with a barbecue gas grill. This cart and grill unit is designated by the general reference character 10. Initially, as shown in FIG. 1, the unit 10 is removed from its shipping container in the folded, preassembled condition.

With reference to FIGS. 2 and 6, it will be observed that the grill subassembly 12 is preferably factory assembled to the wheel upright member 13 by means of a dual purpose pivot/latching mechanism indicated by the general reference character 14 (see FIG. 6) which will hereinafter be described.

Thus, the subassembly 11 comprises the wheel upright member 13, a relatively flat, sheet metal platform 15, and a caster upright member 16. The preassembled elements 13, 15 and 16 are pivotally attached relative to one another to provide ready means for unfolding from the collapsed position of FIG. 1 to the final assembly of FIGS. 3 and 4. No tools are required to assemble the unit 10 from the collapsed position of FIG. 1 to the final assembly position of FIGS. 3 and 4.

Referring to the upright members 13 and 16, it will be observed from FIGS. 4 and 9 that each U-shaped upright 13, 16 includes a pair of bifurcated legs 13a, 13b and 16a, 16b, respectively. The legs are bent downwardly from an integral supporting bight rail portion 13c and 16c, respectively (see FIG. 1). The upright members 13 and 16 may be formed of a tubular extrusion as shown in the cross-sectional view of FIGS. 7 to 9 inclusive and providing ribs or undulations 17 throughout the length of each upright member. The ribbing 17, besides being ornamental, adds additional strength to the respective uprights 13, 16.

The inner surface of legs 13a, 13b and 16a, 16b, included sidewall openings 19 (see FIG. 10) for receiving and securing an axially movable pin 21 extending laterally from a fastening bracket 22 welded or otherwise fastened to a sheet metal grill support 23 at either side of the grill bottom 24 of the grill assembly 12. The pin 21 is provided with flattened ears 25 acting as a stop resting on the U-shaped fastening mechanism 22. A compression spring 26 biases the pin axially to the left as shown in FIG. 10 for seating in the opening 19 as a means of securing the uprights to the respective grill supports 23.

It will thus become apparent, with reference to FIGS. 2, 5, 6 and 10 that as the unit 10 is unfolded from the view of FIG. 1, each of the respective members are held relative to one another by the respective latching mechanisms 22 without need for additional tools. In the past, a multitude of fasteners, such as nuts, bolts and washers plus cap nuts and other components have been required for retaining components of carts or tables together. Assembly was obviously a very frustrating experience for the consumer, and certainly an unpleasant experience, and often relatively complex to the mechanically unsophisticated person. In the present preassembly, all that is required is the mere unfolding of the respective members, which may be shipped in pivoted relationship and snapped into place by the latching mechanisms, nearly ready for immediate use.

With reference to FIGS. 5, 6 and 9, it is also preferred to provide additional stabilizing means which automatically come into play during the unfolding procedure. With respect to FIG. 5, it will be noted that laterally extending rivets or other protruding means 30 are provided for receiving an inwardly notched portion 31 of the latching mechanism 22 which will minimize or prevent lateral side wise movement with respect to its leg 16a. Again, with reference to FIG. 6, it will be observed that, although the mechanism 22 is pivotably attached to the leg 13 by means of a preassembled pivot pin 32, a member 13 and 23 are further secured and stabilized by means of the previously described axially movable pin 21 and the opening 19 of the leg 13.

From FIG. 9, it will be further observed that an additional automatically operated stabilizing means is provided by means of the stabilizer bracket 35 fastened to the side wall of the grill bottom 24 by means of screws or bolts 36 and having a rivet member 37 secured to its outer end and received in an opening in the intermediate portion 16c of the upright 16. Although not shown specifically, a substantially identical stabilizing mechanism is used at the opposite side for stabilizing the upright 13 with respect to the grill assembly 12. The stabilizer mechanism automatically comes into play as the members are disposed in final assembly position with respect to one another.

For purposes of completing the description of the cart or table, it will be noted that the unit 10 may be provided with enlarged wheels 40 preferably supported from the upright 13 by means of a transverse axle (not specifically disclosed) extending through openings in the legs 13a and 13b of the upright 13 and openings in the sheet metal platform 15 with appropriate fasteners 41 being provided at the extremities of the rod or axle.

At the lower extremity of the legs 16a and 16b, there may be provided casters 44 disposed at the end of stems 45 removably seated in conventional supports 46, respectively.

The grill assembly 12 is conventional, and is provided with a grill bottom 24 and removable top 48 having laterally extending insulated handles 49. It is usual, in grills of the type shown, to provide a supply of LP gas contained in the tank 50 shown in phantom in FIGS. 3 and 4. The tank is seated on the platform 15 and additionally secured to the unit 10 by means of an encircling strap 51 in the legs 13a, 13b of the wheel upright 13. A conventional venturi is shown at 52 (see FIG. 1) for supplying the LP gas to the grill bottom 24 in conventional manner.

It will be apparent that the present invention has provided a convenient cart/table assembly having particular application with gas fired grills, and ready for immediate final assembly as removed from the carton in collapsed condition without requiring additional tools (other than perhaps a wrench for applying a fitting to the LP tank). The invention further contemplates the provision of removable side shelves shown secured to the uprights 13 and 16 at the intermediate portions 13c and 16c. The shelves 55 are respectively removably attached, as shown in the detailed views of FIGS. 7 and 8. Shelf slot members are riveted to the portions 13c and 16c and are arranged to receive laterally extending support fingers 57 shown in the unsecured position relative to FIGS. 2 and 8. Each of the fingers 57 include a leaf spring latch member 58 fastened to the underside of the respective finger 57 by means of a transverse pin 59 and extending rearwardly with respect to the finger 57. The leaf spring 58 includes a detent 60 pierced and formed therein, which is arranged to be received by an indent opening 61 in the slot member 56 as shown in the view of FIG. 7 with the finger 57 of the shelf 55 seated and secured inwardly of the slot member 56. To release the shelf 55 from the secured position of FIG. 7 for cleaning or storing purposes, mere manual finger pressure on the distal end portion of the spring 58 will cause the detent 60 to be released from its receiving opening 61 and withdrawing the finger 57 from the slot member 56.

WHAT IS CLAIMED IS:
1. A table unit comprising:
a base member;
oppositely disposed first and second upright members, each of said upright members being pivotally attached to said base member at opposite ends of said base member;
a top member pivotally attached at one end thereof to said first upright member;
said first and second upright members, said base member and said top member each being respectively preassembled in pivotally attached relationship and arranged for pivotal movement from a collapsed position to an upright operating position;

first fastening means for securing said second upright member to said top member to complete assembly of the respective member after unfolding said members from said collapsed position.

2. The table unit of claim 1 including second fastening means for stabilization of said members relative to one another.

3. The table unit of claim 1, wherein said top member comprises a stationary cooking element of a barbecue grill assembly.

4. The table unit of claim 3, wherein the top member comprises the bottom of a gas-fired barbecue grill assembly and said base member is arranged for support of a tank containing the gas for said grill assembly.

5. The table unit of claim 1 including at least one removable shelf extending laterally from said table unit.

6. The table unit of claim 1, wherein at least one of said upright members is an integrally formed unit of tubular stock bent intermediate its ends to provide a generally U-shaped configuration defining bifurcated leg portions joined by and depending from said intermediate bight portion.

7. The table unit of claim 6, wherein said upright member is formed to provide a plurality of transversely spaced, parallel, longitudinal ribs substantially extensive of the length of the upright member.

8. The table unit of claim 2, wherein said second fastening means comprises a mechanical latch defining a detent and indent elements arranged for cooperative engagement upon pivoting of said unit to the upright operating position.

9. The table unit of claim 1, wherein said first fastening means comprises a spring biased detent element on said top member engageable with an indent element on said second upright member.

10. The table unit of claim 9, wherein the first fastening means includes a protruding detent engageable with a notched indent for minimizing sidewise movement of said top member relative to said second upright member.

11. The preassembled support unit of claim 1, wherein a laterally extending shelf is provided with at least one laterally extending finger removably engageable with a slotted member and including manually releaseable spring means including a detent portion engageable with an indent formed in said slotted member.

12. A barbecue grill comprising:
a base member;
oppositely disposed first and second upright members, each of said upright members being pivotally attached to said base member at opposite ends of said base member and being an integrally formed unit of tubular stock bent intermediate its ends to provide a generally U-shaped configuration defining bifurcated leg portions joined by and depending from an intermediate bight portion;
a barbeque grill cooking unit pivotally attached at the lower side of one end thereof to said first upright member at a point intermediate the ends thereof;
said first and second upright members, said base member and said top member each being respectively preassembled in pivotally attached relationship and arranged for pivotal movement from a collapsed position in which said cooking unit is folded against said first upright member to an upright operating position;
first fastening means for securing said second upright member to said top member to complete assembly of the respective member after unfolding said members from said collapsed position;
second fastening members for securing the upper side of said pivotally attached end to the bight portion of said first upright member.

* * * * *